US009078393B1

(12) United States Patent
Polizotto

(10) Patent No.: US 9,078,393 B1
(45) Date of Patent: Jul. 14, 2015

(54) ACTIVATED-RELEASE FERTILIZER, PESTICIDES, AND OTHER GRANULES, GERMINATION-ACTIVATED SEEDS, AND METHODS OF MAKING AND USING SAME

(71) Applicant: Activation Technologies LLC, Greenfield, IN (US)

(72) Inventor: Kim R. Polizotto, Greenfield, IN (US)

(73) Assignee: Activation Technologies, LLC, Greenfield, IN (US)

( * ) Notice: Subject to any disclaimer, the term of this patent is extended or adjusted under 35 U.S.C. 154(b) by 164 days.

(21) Appl. No.: 13/800,255

(22) Filed: Mar. 13, 2013

Related U.S. Application Data

(60) Provisional application No. 61/635,588, filed on Apr. 19, 2012, provisional application No. 61/610,115, filed on Mar. 13, 2012.

(51) Int. Cl.
*A01C 21/00* (2006.01)

(52) U.S. Cl.
CPC .................................. *A01C 21/005* (2013.01)

(58) Field of Classification Search
CPC ............................. A01C 21/005; A01C 21/00
USPC ........... 111/118, 20, 900, 915, 916, 923, 200; 47/57.6, 57.7, 58.1 R, 58.1 SC
See application file for complete search history.

(56) References Cited

U.S. PATENT DOCUMENTS

| 2,219,495 | A |   | 10/1940 | Morozov et al. |
|---|---|---|---|---|
| 3,278,658 | A | * | 10/1966 | Immel ............................. 264/51 |
| 5,190,766 | A |   | 3/1993  | Ishihara |
| 5,271,470 | A | * | 12/1993 | King et al. ....................... 172/40 |
| 5,767,168 | A |   | 6/1998  | Dyer et al. |
| 6,039,781 | A |   | 3/2000  | Goertz et al. |
| 6,068,857 | A |   | 5/2000  | Weitschies et al. |
| 6,890,888 | B2 |  | 5/2005  | Pursell et al. |

(Continued)

FOREIGN PATENT DOCUMENTS

| CA | 2219495 | 5/1995 |
|---|---|---|
| CN | 2219495 | 5/1995 |

(Continued)

*Primary Examiner* — Christopher J Novosad
(74) *Attorney, Agent, or Firm* — Overhauser Law Offices LLC

(57) ABSTRACT

An activated-release, water-insoluble or slowly-soluble coating is utilized on fertilizers, pesticides, seeds, medicine, and other granules to precisely time the release of the active ingredient of the granules, for purposes such as fertilizer and pesticide release as well as to initiate seed germination. An external stimulus, or activating agent, including, but not limited to, microwaves, ultrasonic waves, X-rays, radio waves, electromagnetic waves, radar waves, sonar waves, magnetic induction, (or pulses of any of the foregoing), specific chemical, bacteria, or fungus organism (such as ionic or non ionic surfactants, organic solvents, specifically cultured bacteria, fungi or catalytic agents) is used to break the coating, thus allowing for the release or germination. An activating device may be mounted on or in a tool bar, cart, or other apparatus pulled by a tractor, all-terrain vehicle (ATV), airplane, helicopter, or other implement and passed over a field, sprayed onto or injected into the soil, when the granule content is actually needed or germination is sought. The present disclosure also relates to liquid fertilizers of complex chemistry that are not readily available to plants; activation will degrade the nutrient compounds to readily-available forms.

9 Claims, 2 Drawing Sheets

(56) References Cited

U.S. PATENT DOCUMENTS

| | | |
|---|---|---|
| 7,682,656 B2 | 3/2010 | Xing et al. |
| 7,892,571 B2 | 2/2011 | Sjogren et al. |
| 7,968,117 B1 | 6/2011 | Morrison et al. |
| 2004/0121019 A1 | 6/2004 | Perrier et al. |
| 2005/0076687 A1 | 4/2005 | Whittington |
| 2005/0277549 A1 | 12/2005 | Seitz et al. |
| 2006/0073205 A1 | 4/2006 | Ohta et al. |
| 2008/0299066 A1 | 12/2008 | Wellinghoff et al. |
| 2010/0006015 A1* | 1/2010 | Montag et al. ............... 111/118 |
| 2010/0234223 A1 | 9/2010 | Pursell et al. |
| 2010/0263867 A1 | 10/2010 | Horton et al. |
| 2010/0281772 A1 | 11/2010 | Wilson et al. |
| 2011/0172175 A1 | 7/2011 | Chow et al. |
| 2011/0263843 A1 | 10/2011 | Watanabe et al. |

FOREIGN PATENT DOCUMENTS

| | | | |
|---|---|---|---|
| CN | 20091147796 | | 11/2009 |
| CN | 20091147796 A | | 11/2009 |
| CN | 101884280 A | * | 11/2010 |
| JP | 56-170433 | | 4/1983 |
| JP | 60251110 A | * | 12/1985 |
| JP | 2002369893 A | * | 12/2002 |
| UA | 20070004565 U | | 8/2007 |

* cited by examiner

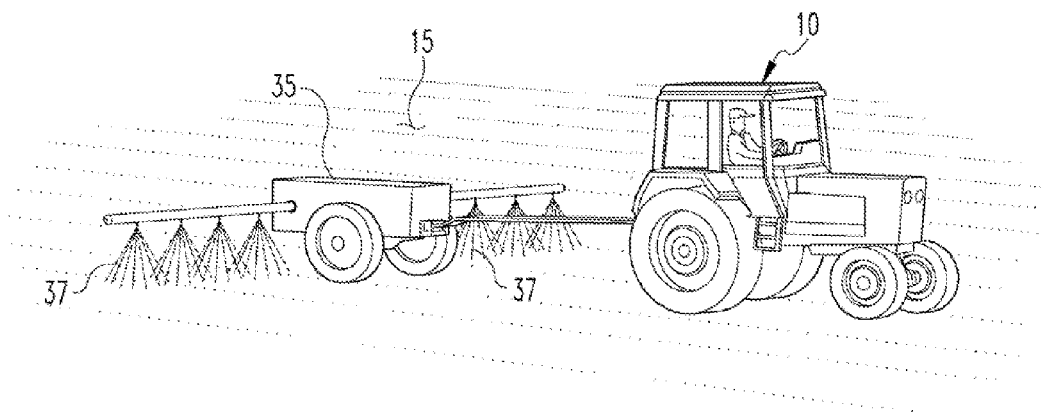
Fig. 3
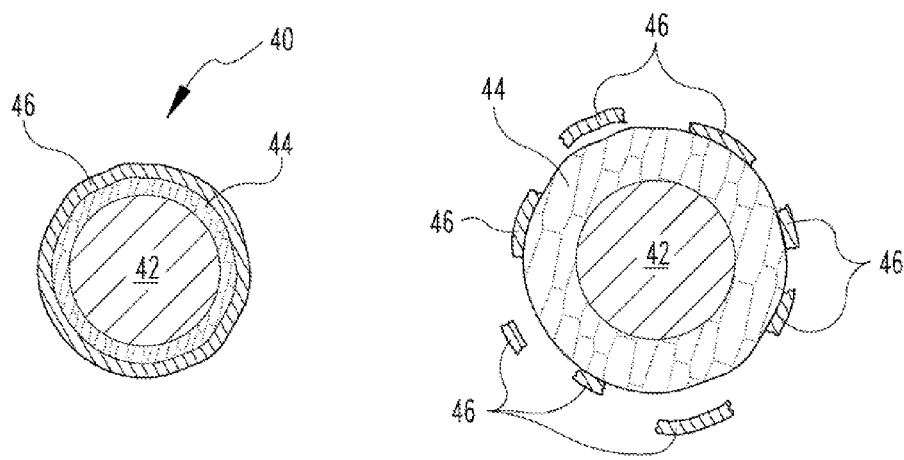
Fig. 4  Fig. 5

ACTIVATED-RELEASE FERTILIZER, PESTICIDES, AND OTHER GRANULES, GERMINATION-ACTIVATED SEEDS, AND METHODS OF MAKING AND USING SAME

RELATED APPLICATION DATA

This application claims the benefit of U.S. Provisional App. No. 61/635,588 filed Apr. 19, 2012 and U.S. Provisional App. No. 61/610,115 filed Mar. 13, 2012, the disclosures of which are hereby incorporated by reference.

FIELD OF THE INVENTION

The present disclosure relates to coated dry fertilizers, liquid fertilizers including those of complex chemistry not readily available to plants, pesticides, seeds, and medicines, and, more particularly, to a water-insoluble, or slowly-soluble, activated-release coating therefore and method of making and using same.

BACKGROUND

Commercial fertilizers contain nutrients that are essential for plant growth, with the three main nutrients being nitrogen (N), phosphorus (P), and potassium (K). Commercial fertilizers are highly concentrated and water soluble. When fertilizer is applied to soil, it dissolves in the water present in the soil, and the nutrients are free to react with soil minerals, other chemicals, and micro-organisms.

Nitrogen undergoes microbial transformations in the soil. In its end form, nitrate, it can leach from the soil and/or, by the denitrification process, can volatilize into the atmosphere when conditions are right. Leaching losses can be very detrimental to the environment as nitrates in ground water promote the growth of algae blooms and can cause the oxygen-deprivation condition hypoxia. It is documented that nitrate leaching and run-off in the Mississippi River Basin and Chesapeake Bay drainage contributes to the hypoxia zone in the Gulf of Mexico and Chesapeake Bay. Presently there are many government programs proposed and being implemented to reduce nitrate loading in these and other locations. Improved management of nitrogen in fertilizer and other agricultural contexts is a key target for these efforts and a worldwide priority.

Nitrogen denitrification is also detrimental to the environment. This process occurs when soils are water-saturated and soil micro-organisms metabolize nitrate nitrogen to capture oxygen. Once this occurs, gaseous nitrogen and nitrous oxide gas are released. Nitrous oxide is a powerful greenhouse gas that destroys ozone in the atmosphere.

To prevent and lessen nitrogen loss from fertilizer applications, farmers presently attempt to apply the right amount of fertilizer at the best time of year and place it where it has the least loss potential. Unfortunately, nitrogen soil reactions are very rainfall and temperature dependent. So, despite farmers' best efforts, a significant amount of nitrogen is lost from the cropping system each year.

The most common and popular form of solid nitrogen fertilizer is urea. Urea nitrogen is produced as granules and prills and is subject to the same losses mentioned above, but, in addition, surface-applied urea is subject to volatilization. To lessen the chance of urea volatilization, leaching, and denitrification, different coatings and additives are being applied to urea to slow down its dissolving in the soil, and to interrupt the reactions it undergoes in the soil. Such urea coatings include sulfur, slowly-soluble chemical polymers, and chemicals that interrupt bacterial reactions with urea, such as dicyandiamide (DCD) and the AGROTAIN® brand urease inhibitor offered by Koch Industries (formerly AGROTAIN International, L.L.C.), of St. Louis, Mo.

Because the coatings increase the cost of urea nitrogen, such fertilizers have been used primarily in high-value markets like turf grass, ornamentals, and fruit and vegetable production. With the present emphasis on the environmental impacts of fertilizer nitrogen, however, there is a great deal of interest in using these technologies in grain crop production. One company, Agrium Advanced Technologies of Loveland, Colo., is presently marketing a polymer-coated urea product for grain production systems.

Yet existing coatings and chemical additives for urea do not fully address the crop and environmental needs in managing nitrogen fertilizer. The ideal nitrogen fertilizer would be one that farmers or custom fertilizer applicators could apply when field conditions permit, but would only become available to the crops when needed. Since that time varies, depending on several factors, such as the type of crop grown, stage of crop development, the weather, and planting date, the present technology does not meet farmers' needs.

Other forms of dry nitrogen fertilizer are ammonium nitrate and ammonium sulfate. The nitrogen in these fertilizers undergoes the same chemical conversions in the soil that results in nitrate leaching and denitrification, so using these materials does not solve environmental issues of concern.

Chemically-complex, slowly-available, liquid nitrogen fertilizers are also marketed as controlled-release sources of nitrogen. Like the dry nitrogen fertilizers, the nitrogen availability in these materials is strongly dependent on soil moisture, temperature, and soil microbe activity, and this fertilizer format also does not solve the environmental issues of concern.

Phosphorus in surface waters also is responsible for increase alga growth and also contributes to the hypoxic zones in the Gulf of Mexico and Chesapeake Bay. Agricultural phosphorus enters surface waters primarily through soil erosion and improper manure management. Fertilizer phosphorus is very reactive in soils and can react and form chemical complexes with other minerals in the soil. The rate and extent to which this occurs is very pH dependent. On alkaline soils, fertilizer phosphates quickly react with calcium in the soil and form insoluble calcium phosphate compounds. This greatly reduces the availability and efficiency of phosphate fertilizers. The longer the fertilizer phosphate is in contact with soil, the greater the amount of phosphate that is tied up or fixed in the soil. In highly acid soils, fertilizer phosphate can react with iron and/or aluminum to form insoluble compounds that render the phosphate unavailable to plants. Protecting fertilizer phosphate using slow-release coatings is not presently practiced in agriculture. If the timing of release could be more precisely controlled, such technology would offer great promise in improving phosphate fertilizer use efficiency, as well as affording farmers and custom applicators a great deal of flexibility in when and how the phosphate fertilizer is applied.

With regard to pesticides, their toxicity and environmental fate has long been a concern in agriculture and in general use. In agriculture, the timing of herbicide, insecticide, nematicide, fungicide, and rodenticide applications is very often dependent on when the product can be applied. Weather, soil conditions, development of the crop, life stage of the pest, and timing the application to be effective when the pest is present are all critical factors that affect how and when pesticides are applied and how well they work. If the timing of release of pesticides after application could be precisely controlled, it would offer many advantages over how things are done today. More pesticides would be viable because they would not have to last as long between application and actual need. Also, it would give the applicator a great deal of flexibility as to when and how the material is applied. It would increase the efficacy of the product as well. This would be possible in the soil-applied herbicide, insecticide, nematicide, and rodenticide market. Presently, though, there are no products in the pesticide market that utilize any type of activated release mechanism.

Seed planting and germination normally takes anywhere from three to fourteen days, depending on the seed type, soil temperature, and soil moisture. Farmers time their various plantings to make sure each crop has enough time to mature, and to avoid environmental stress from too much or too little rain, or temperature extremes, during growth and development. Because of weather-related problems or time constraints, it is extremely difficult to plant an entire crop or farm during the ideal time frames. This is especially true for large-acreage farms. If farmers had the option to plant seeds whenever soil conditions allowed, but could control when germination was initiated, it would give them tremendous flexibility in their farming operation. Initiating germination could be a very quick process compared to the overall planting operation. Using seed coatings and having an external source method of breaking or dissolving the coating would offer farmers this flexibility in their operation.

Presently there are polymer coatings for various seeds, but the breakdown of the coatings depends on soil water, temperature, and time. These seeds have not been adopted by many farmers because of the germination variables. Having an activated-release coating for seeds would prove much more useful for farmers.

In short, the problem with present technologies is that the time it takes for fertilizer or pesticide to become available to crops, or for seeds to germinate, is totally dependent on two things most farmers cannot control: soil moisture and temperature.

SUMMARY

The present invention may comprise one or more of the following features and combinations thereof.

A water-insoluble, or slowly-soluble, coating is utilized on fertilizers, pesticides, seeds, medicines, and other granules to precisely time the release of the active ingredient of the granules, as well as initiate seed germination. An external stimulus, activating means or agent, including, but not limited to, various electronic or sound pulses, microwaves, ultrasonic waves, X-rays, radio waves, electromagnetic waves, radar waves, sonar waves, and magnetic resonance and induction, or various pulses of the same, a specific chemical, bacteria, or fungus organism, is used to break or break down the coating, thus allowing for the release of the fertilizer or pesticide, for example, or to initiate seed germination.

In a particular illustrative embodiment, such a coating is capable of use with all types of dry fertilizers, and it can be activated or broken down by an external source other than water, micro-organisms, or temperature. The coating may be a completely new compound or polymer, or an existing one, that is not water-soluble or one that is slowly-soluble. With such a material, temperature, micro-organisms, or moisture will not have a significant effect on the coating breakdown and release of chemicals or other contents from the granule.

In another particular illustrative embodiment, such a coating is capable of use with all types of dry fertilizers, pesticides, or seeds, and is activated or broken down by an external activation means or agent other than water or temperature. The activating means or agent may be applied in water or another solvent, and includes ionic or non ionic surfactants, organic solvents, specifically cultured bacteria, fungi, or catalytic agents. The coating may be a completely new compound or polymer, or an existing one, that is not water-soluble or one that is slowly-soluble. The activating means or agent is specifically tailored to the particular coating material employed. With such a material, temperature, or moisture will not have a significant effect on the coating breakdown and release of chemicals or other contents from the granule.

A further alternative is to add, during manufacturing, a material directly to the fertilized or other granule that could stimulate the breakdown of the coating when activated by an external source. In one instance, this essentially is the adding of a metal flake or another material to the fertilizer itself at the manufacturing stage, a process which may prove simpler and more cost-effective than adding such material to the coating.

As noted, in one illustrative embodiment, the water-insoluble coatings are employed in a pesticide context. Inert granules are impregnated or coated with a given pesticide to make a prill or granular pesticide, as is known in the art, and the pesticide prills or granules are then coated with a polymer or other chemical coating that does not readily dissolve or break down in the soil. With such a material, temperature or moisture will not have a significant effect on the coating breakdown and release of chemicals from the granule.

In yet another illustrative embodiment, a coating is utilized on seeds, with the coating being capable of being activated or broken down by an external source, one other than water or temperature. As with all other embodiments, the coating could be a completely new or existing compound or polymer that is not water-soluble, or is one that is slowly soluble. Another option is to add a material to new or existing water-insoluble or slowly-soluble chemical coatings that could stimulate the breakdown of the coatings when activated by an external source, including, but not limited to, that disclosed herein. Notably, the technology may be applied to hybrid seed production.

With regard to activation means, material and/or agents, one or more activating devices, or surface broadcasting devices may be mounted on a tool bar or other apparatus on, or pulled by, a tractor, all-terrain vehicle (ATV), airplane, helicopter, or other implement and passed over a field or injected into the soil when the fertilizer or pesticide would be most efficacious, or when seed germination is desired. The specific activation method used will depend on the particular coating best suited for the purpose and soil depth that the source is capable of penetrating. In one form, rain water and/or irrigation water can carry the activating agent through the soil to the particles being activated. The activating agent could be a solution or a dry material, depending on the preferred method of delivery and proven efficacy. This limited-time, and "on-demand," release will, for example, greatly reduce nitrogen exposure and loss to the environment and help keep phosphorus more available to crops.

Additional features of the disclosure will become apparent to those skilled in the art upon consideration of the following detailed description of the illustrative embodiment and accompanying drawings in which:

FIG. 3 is a perspective view showing the spraying of activating material onto the field.

FIG. 4 is a cross sectional view of a granule in its unactivated state according to an embodiment.

FIG. 5 is a cross sectional view of the FIG. 4 granule in its activated state.

DESCRIPTION OF THE ILLUSTRATIVE EMBODIMENTS

Figure 1:
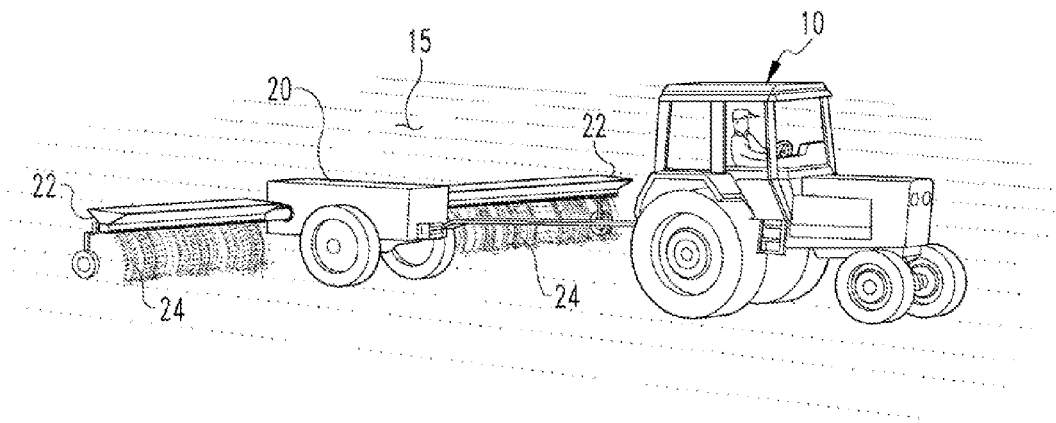
FIG. 1 is a perspective view showing the application of coated granules to a field.
Figure 2:
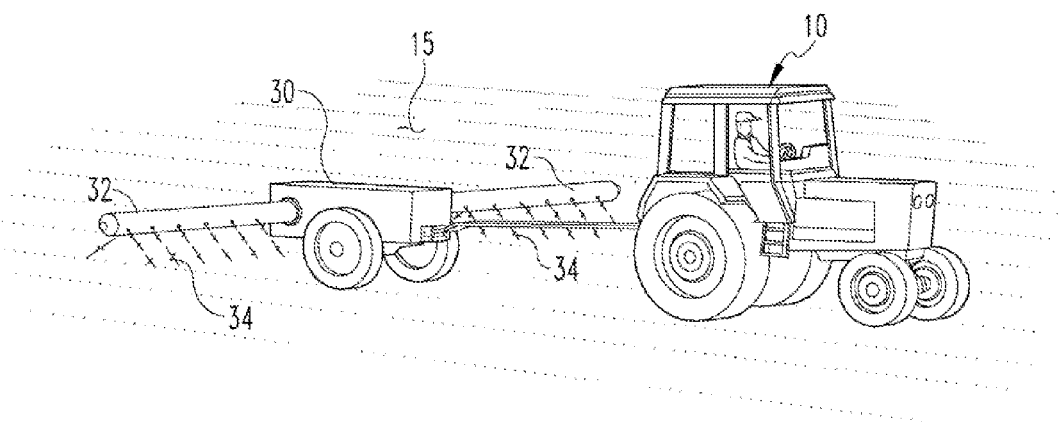
FIG. 2 is a perspective view showing the application of activating waves to the field.

For the purposes of promoting and understanding the principles of the invention, reference will now be made to one or more embodiments illustrated in the drawing and specific language will be used to describe the same.

FIG. 1 shows a tractor 10 pulling distribution equipment 20 through a field 15. The distribution equipment 20 includes a spreading mechanism 22 that is used to deposit coated granules 24 onto a field 15S. These coated granules are then allowed to remain in the field in their unactivated state for a period of time, which may be on the order of days, weeks or even months. During this time, the weather, soil conditions, and other appropriate factors are monitored in order to make a determination of an appropriate time to activate the granules, and then the granules are activated by delivering an appropriate activating agent into the field.

FIG. 2 shows a tractor 10 pulling activating equipment 30 including transmitters 32 that emit activating waves 34. FIG. 3 shows a tractor 10 pulling activating equipment 35 that sprays an activating material 37 onto the field. The activating waves 34 and/or activating material 37 delivered into the field by the activating equipment 30 interact with the granules to cause a breakdown in the coating, thereby allowing the active ingredient to be release into the soil.

In this way, a water-insoluble or slowly-soluble coating may be utilized on fertilizers, pesticides, seeds, and virtually any other type of granule to precisely time the release of the active ingredient of the granule, for a variety of purposes, including fertilizer and pesticide discharge or the initiation of seed germination. The coating may be a novel or existing compound or polymer that is not water-soluble, is slowly soluble, and is slowly biodegradable. The particular material utilized for the coating may vary widely and, simply stated, is one for which temperature or moisture may not have any significant breakdown effect on the coating.

Another coating design option is to add a material to new or existing water-insoluble or slowly-soluble chemical coatings that could stimulate the breakdown of the coating when activated by an external source. An illustrative example of activating agent addition is the inclusion of metal filings in the coating, for eventual exposure to microwaves; the metal will react with the microwaves and break the coating. Other agents that could aid in breaking or dissolving the coating are readily available and known to those skilled in the chemical art and physical sciences.

FIG. 4 shows an exemplary coated granule 40 having an active ingredient 42 surrounded by an inner coating layer 44 and an outer coating layer 46. The outer coating layer 46 is a water-insoluble or slowly-soluble coating. The inner coating layer 44 is made of an expandable material, such as an expandable foam, that expands when exposed to the activating agent. Accordingly, when exposed to the activating agent, the inner coating layer 44 expands to thereby cause the outer coating layer 46 to break apart, as shown in FIG. 5.

Methods for applying the coating to the granules include those known in the manufacturing art, such as the following illustrative, non-exclusive means:

A rotary drum with spray-on or drip-with-roller application (a myriad of possibilities exist for the internal design of the drum);

A pug mill with spray-on or drip-with roll-on application (again, the designs are myriad);

Fluid beds for spray-on application;

Blenders, such as a ribbon blender or any other capable of spray-on or drip-and-roll-on application, including those offered by the Continental Products Corp. of Milwaukee, Wis.;

Falling granules, via spray-on application, such as that configured to occur between conveyor belts;

A screw conveyor, using spray-on or drip-and-roll-on application;

Spray dryers providing atomized mist application;

Rotating pans configured for spray-on or drip-and-roll-on application;

Static application followed by mechanical turning; and

Dip coating.

As indicated, an external stimulus, activating means or agent, is used to break the water-insoluble or slowly-soluble coating, triggering the release of the fertilizer or pesticide, for example, or initiating seed germination. Such external stimulus, activating means or agent are inclusive and may comprise, but are in no way limited to, various electronic or sound pulses, microwaves, ultrasonic waves, X-rays, radio waves, magnetic resonance, electromagnetic waves, radar waves, sonar waves, magnetic induction, specific chemical, bacteria, or fungus organism that breaks down the coating of the fertilizer, pesticide or seed.

In a particular illustrative embodiment, such a water-insoluble or slowly-soluble coating is capable of use with all types of dry fertilizers, including urea and those which are ammonium, nitrate, phosphorous, or potassium-based and including physical and chemical blends of fertilizers containing any or all essential plant nutrients. The coating can be activated or broken down by an external source other than water, micro-organisms, or temperature. Alternatively, a liquid fertilizer formulation, for which the water solubility and/or chemical availability can be altered by exposure to external stimuli, may be used.

In another particular illustrative embodiment, such a water-insoluble or slowly-soluble coating is capable of use with all types of dry fertilizers, including urea and those which are ammonium, nitrate, phosphorous, or potassium-based and including physical and chemical blends of fertilizers containing any or all essential plant nutrients. The coating can be activated or broken down by an external source other than water or temperature; the external source being a specific chemical, bacteria, or fungus organism—such as, but not limited to, an ionic or non-ionic surfactants, organic solvents, specifically cultured bacteria or fungi or catalytic agent(s). Rain water or irrigation water would carry the activating agent through the soil to the particles to be activated. The activating agent could be a solution or a dry material, depending on the preferred method of delivery and proven efficacy.

The presently-disclosed activated-release coating technology also allows for use with prill or granular pesticides, thereby limiting environmental exposure and improving the efficacy of pesticide applications for many different pests. One example would be use with an insecticide intended to eradicate termite and/or fire ant colonies. To control an ant colony, one needs a chemical that can be carried back to the queen and rest of the colony. By using a bait type of formulation with the coating, ants can carry the toxin into the colony without being affected by the toxin. At a later time, when the colony is most susceptible, the granule may be activated and the toxin released. Coated pesticides will thus have possible residential and commercial application, in addition to use in the agricultural setting. In another setting, coated nematicide granules may be used to eliminate parasitic nematodes or roundworms, a significant pest in the agricultural and horticultural areas.

In another illustrative embodiment, the water-insoluble and activated-release coating is utilized on seeds, with the coating eventually being broken down by an external stimulus in order to allow germination. This coating technology has particular application in hybrid seed production. In such production, the male and female seeds are often planted days apart because they may not reach the reproductive stage at the same time. Through timing the plantings separately, seed producers can get better pollination and seed fertilization occurring together, and improve seed quality and yield. By using the technology disclosed herein, all planting could be done simultaneously, with the germination of one of the parents would be controlled at a later date. This will dramatically speed up and simplify the planting operation of hybrid seed producers, an increasingly-important segment of the seed market.

An additional illustrative embodiment is with medication, where the water-insoluble coating is applied to pill, tablet, or capsule-form medicine for later release via activation means discussed herein. This will serve to precisely control when the medicine is released into the patient's body.

To deliver the external stimuli or activator, one or more activating devices may be mounted on or in a tool bar, cart, trailer, or other apparatus that is pulled or otherwise integrated with a tractor, all-terrain vehicle (ATV), airplane, helicopter, or other implement and passed over a field when, for example, the nitrogen or other granule content is actually needed by the crops planted in the field or seed germination is sought. The tool bar, cart, or other stimulus-delivery apparatus will be equipped to directionally propagate the waveforms via sources and at wavelengths known to those skilled in the physical sciences, preferably with minimal wave scattering or attenuation. The soil penetration of the waves or pulses may vary, but is at least three to five inches in one embodiment. The exposure time required for activation may vary and depending on factors such as the type of coating and the depth of the granule or seed.

In another embodiment, one or more activating devices may be mounted on a boom that may be pulled by a vehicle. For example, the activating devices may be mounted on a boom similar to one used to mount agricultural sprayers. In another embodiment, the activating device(s) may be mounted on a boom that also includes sprayers or broadcasters. In yet another embodiment, the activating device(s) may be mounted on a boom that provides for injection of the activation means or agent into the soil. This embodiment can also allow liquid materials to be applied at the same time that the activating device(s) are utilized. Alternatively, the activating device(s) may be mounted on other equipment used in agricultural applications, such as planters, cultivators, or combines. The invention also contemplates applying activating waves or pulses to materials previously placed on or in the ground via booms or equipment that are simultaneously used to perform other agricultural processes, such as planting, spraying, harvesting, tilling, and the like.

In yet another embodiment, the activating devices may be placed into the portions of agricultural tools that engage the soil as the tool is moved across the ground, such as a wheel, tire, plow, coulter, disk, or till for soil injection. Such embodiments may more effectively apply their activating waves or activation agent(s), as they are closer to the soil where the fertilizer, granules, seed or other materials are located.

An added benefit is the effect the activation equipment has on the plants, irrespective of whether fertilizer, pesticides, or seed responses are involved. In other words, plant exposure to the activation means may stimulate a positive growth response and/or increase in yield or quality.

While the invention has been illustrated and described in detail in the foregoing description and drawing, the same is to be considered as illustrative and not at all restrictive in character, it being understood that only illustrative embodiments thereof have been shown and described and that all changes and modifications which are within the scope of the subject matter are desired to be protected.

What is claimed is:

1. A method for timing the activation of agricultural materials in a field, comprising;
    traversing a field with a first piece of equipment to apply coated granules of agricultural material to the field;
    allowing the applied granules to remain in the field in an unactivated state for a period of time; and then
    traversing the field with second piece of equipment to deliver an activating agent to the field, wherein the activating agent serves to convert the granules in the field to an activated state.

2. The method of claim 1 in which the second piece of equipment includes a transmitter and the activating agent comprises activating waves emitted by the transmitter.

3. The method of claim 1 in which the second piece of equipment includes a sprayer and the activating agent comprises activating material sprayed onto the field.

4. The method of claim 1 in which the period of time is at least one week.

5. The method of claim 1 in which the coated granules comprise seeds.

6. The method of claim 1 in which the coated granules comprise fertilizer.

7. The method of claim 1 in which the coated granules comprise pesticide.

8. The method of claim 1 in which the granules are coated with a water-insoluble or slowly-soluble coating and the activating agent stimulates the breakdown of the coating.

9. The method of claim 8 in which the activating agent stimulates the breakdown of an outer coating layer by causing an inner portion of the granule to expand.

* * * * *